US010273906B2

(12) United States Patent
McQuillen et al.

(10) Patent No.: US 10,273,906 B2
(45) Date of Patent: Apr. 30, 2019

(54) METHOD AND SYSTEM FOR ENGINE EXHAUST CATALYST OPERATIONS

(71) Applicant: Ford Global Technologies, LLC, Dearborn, MI (US)

(72) Inventors: Michael McQuillen, Warren, MI (US); Daniel A. Makled, Dearborn, MI (US); David John Kubinski, Canton, MI (US); Richard E. Soltis, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 15/481,383

(22) Filed: Apr. 6, 2017

(65) Prior Publication Data

US 2018/0291843 A1    Oct. 11, 2018

(51) Int. Cl.

| F01N 9/00 | (2006.01) |
|---|---|
| F01N 11/00 | (2006.01) |
| F02D 41/00 | (2006.01) |
| F02D 41/02 | (2006.01) |
| F02D 41/06 | (2006.01) |
| F02M 25/022 | (2006.01) |
| F01N 3/00 | (2006.01) |

(52) U.S. Cl.
CPC .......... *F02M 25/0227* (2013.01); *F01N 9/00* (2013.01); *F01N 11/002* (2013.01); *F02D 41/0025* (2013.01); *F02D 41/027* (2013.01); *F02D 41/0255* (2013.01); *F02D 41/064* (2013.01); *F01N 2560/028* (2013.01); *F01N 2560/06* (2013.01); *F01N 2570/22* (2013.01); *F01N 2900/08* (2013.01); *F01N 2900/1602* (2013.01); *F02D 2200/0802* (2013.01); *F02D 2200/101* (2013.01); *Y02T 10/121* (2013.01)

(58) Field of Classification Search
USPC .................................. 60/274, 275, 284, 285
See application file for complete search history.

(56) References Cited

U.S. PATENT DOCUMENTS

| 5,653,106 | A | * | 8/1997 | Katashiba | ................. F01N 3/20 60/300 |
|---|---|---|---|---|---|
| 5,968,456 | A | | 10/1999 | Parise | |
| 6,026,641 | A | | 2/2000 | Liberty | |
| 6,716,398 | B2 | * | 4/2004 | Caren | .................... B01D 53/90 422/186.04 |
| 9,169,755 | B2 | | 10/2015 | Ulrey et al. | |
| 9,291,125 | B2 | | 3/2016 | Yoshihara et al. | |
| 9,695,728 | B2 | * | 7/2017 | Takada | .................... F01N 3/208 |
| 9,726,076 | B2 | * | 8/2017 | Mulye | .................... F02B 47/02 |
| 9,869,242 | B2 | * | 1/2018 | Leone | ....................... F01N 3/20 |
| 2010/0121559 | A1 | | 5/2010 | Bromberg et al. | |

(Continued)

*Primary Examiner* — Binh Q Tran
(74) *Attorney, Agent, or Firm* — Julia Voutyras; McCoy Russell LLP

(57) ABSTRACT

Methods and systems are provided for controlling exhaust catalyst temperature during an engine cold-start by water injection. In one example, a method may include during the engine cold-start, injecting water into an intake of an engine based on the exhaust catalyst temperature and accumulating water molecules within an exhaust catalyst to generate heat within the exhaust catalyst. In this way, by generating and storing heat within the exhaust catalyst, the exhaust catalyst may be heated up rapidly, thus reducing catalyst light-off time.

20 Claims, 4 Drawing Sheets

(56) References Cited

U.S. PATENT DOCUMENTS

2011/0174267 A1     7/2011   Surnilla et al.
2013/0218438 A1     8/2013   Surnilla et al.
2014/0366508 A1*   12/2014   Ulrey ........................ F01N 3/04
                                                             60/274

* cited by examiner

METHOD AND SYSTEM FOR ENGINE EXHAUST CATALYST OPERATIONS

FIELD

The present description relates generally to methods and systems for controlling exhaust catalyst temperature by injecting water into an engine intake during an engine start.

BACKGROUND/SUMMARY

Engine emission control systems may include one or more exhaust catalysts such as three-way catalysts, NOx storage catalysts, light-off catalysts, and SCR catalysts. At catalyst light-off temperature (e.g., operational temperature), the exhaust catalyst may oxidize and reduce exhaust constituents in an exhaust gas, thereby converting toxic gases and pollutants in the exhaust gas to less toxic pollutants or inert constituents which are then released into the atmosphere. As an example, when operated between 400° C. and 600° C., a three-way catalyst converts reactive nitrogen oxides (NOx), carbon monoxide (CO) and unburned hydrocarbons (HC) into inert constituents such as diatomic nitrogen ($N_2$), carbon dioxide (CO2), and water ($H_2O$). However, during a cold-start of an engine, when a temperature of the exhaust catalyst is below the light-off temperature (e.g., three-way catalyst temperature falls below 400° C.), the exhaust catalyst may not be able to effectively treat the reactive constituents of the exhaust gas, and as a result, cold-start emissions may increase and the toxic constituents in the exhaust gas may be directly released into the atmosphere.

One way to reduce cold-start emissions is to decrease the time taken by the exhaust catalyst to reach light-off temperatures. As such, to expedite the attainment of the catalyst light-off temperature, engine systems may include heater pumps and/or catalyst heaters to preheat the main exhaust catalysts. One example of such an engine system is provided by Parise in U.S. Pat. No. 5,968,456. Therein, during a vehicle cold-start, a thermoelectric generator is used as a heat pump to heat an exhaust catalyst substrate to reduce the time to exhaust catalyst light-off. In this way, the exhaust catalyst comes up to operating temperature more rapidly, thereby reducing the amount of pollutant emissions at vehicle start-up.

However, the inventors herein have recognized potential issues with such a system. As one example, adding a thermoelectric generator for the sole purpose of heating the exhaust catalyst during the vehicle cold-start may increase manufacturing costs. In addition, such systems may increase packaging requirements and complexity of the engine system. In some cases, these additional heaters may increase exhaust backpressure. Increased exhaust backpressure may lead to increased pumping work, reduced intake manifold boost pressure, cause cylinder scavenging and combustion effects, and further result in turbocharger problems.

In one example, the issues described above may be addressed by a method comprising: during a cold-start, injecting water into an intake of an engine based on a temperature of an exhaust catalyst. As such, water injection systems may already exist in engine systems to cool air charge in the intake manifold, reduce knock, control exhaust temperature and for engine dilution. The inventors have recognized that it may be possible to use the existing water injecting system to inject water into the intake manifold during the cold-start to increase water concentration in the exhaust. By increasing the amount of water injected into the intake manifold, water may be accumulated within the porous material of the exhaust catalyst. As such, the water inside the exhaust catalyst may be used to generate heat within the exhaust catalyst. In this way, catalyst light-off times may be reduced and emission compliance requirements may be met without any additional costs.

As one example, small amounts of water (e.g., light mist) may be injected into the intake manifold when an exhaust catalyst temperature is below a threshold temperature. As an engine speed increases and reaches a threshold speed (e.g., cranking speed), more water may be injected into the intake manifold and as a result, water concentration in the exhaust may begin to increase. Herein, water molecules in the exhaust may start to get accumulated and stored in the porous material of the exhaust catalyst. The momentum of the water molecules stored in the exhaust catalyst may begin to increase. The technical effect of storing water in the exhaust catalyst is the momentum of the water molecules stored within exhaust catalyst may be converted to heat energy within the exhaust catalyst. As a result, the exhaust catalyst may begin to warm up. Further, the water stored in the porous material of the exhaust catalyst may provide additional capacitance to store the exhaust heat. The increased momentum and the increased capacitance may compound together resulting in heating the exhaust catalyst rapidly. Thus, the time taken by the exhaust catalyst to reach light-off temperatures (or catalyst light-off time) may be decreased. By decreasing the catalyst light-off time, cold-start exhaust emissions may be reduced. Overall, the benefits of water injection may be extended over a wider range of engine operating conditions, thereby improving engine efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for using a water injection system coupled to a vehicle engine, as described with reference to the vehicle system of FIG. 1, during an engine cold-start to heat up an exhaust catalyst to light-off temperature. A controller may be configured to perform a control routine, such as the example routine of FIG. 2, to activate the water injection system during normal engine operation to control knock, for engine dilution, and to control exhaust temperature. Additionally, during an engine cold-start when an exhaust catalyst temperature is below a threshold, the controller may be configured to perform a control routine, such as the example routine of FIG. 3, to inject water using the water injection system to heat up the exhaust catalyst. Herein, the controller may adjust an amount of water injected into an intake based on one or more of an engine speed, an exhaust catalyst temperature, and a level of water stored in porous materials of the exhaust catalyst as shown in FIG. 4. In this way, the exhaust catalyst temperature may be rapidly increased to catalyst light-off temperature during the engine cold-start, thus reducing cold-start emissions.

Figure 1:
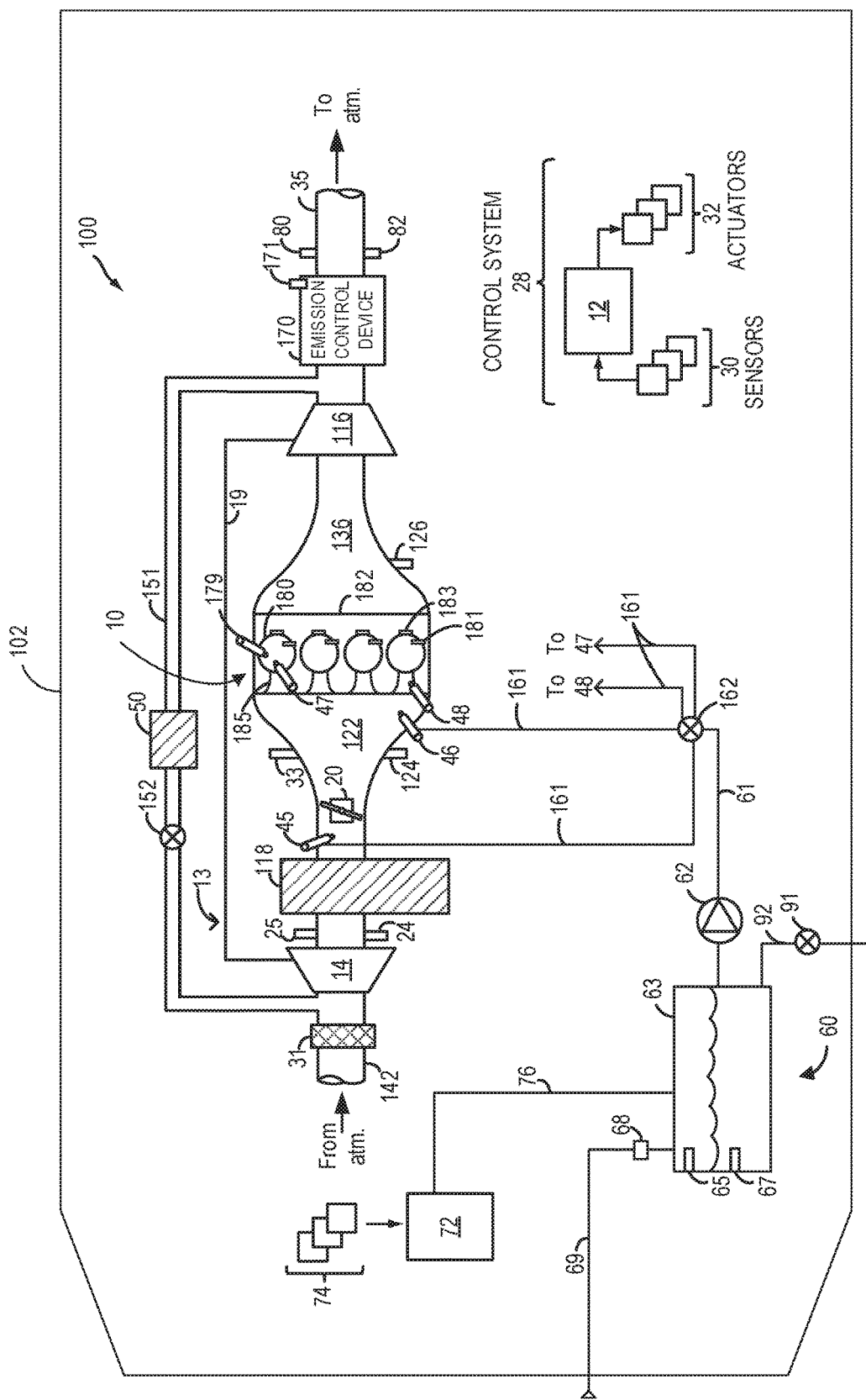
FIG. 1 depicts a schematic diagram of an engine system configured for water injection.

FIG. 1 shows an example embodiment of an engine system 100 configured with a water injection system 60. Engine system 100 is coupled in motor vehicle 102, illustrated schematically. Engine system 100 includes an engine 10, depicted herein as a boosted engine coupled to a turbocharger 13 including a compressor 14 driven by a turbine 116. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 118 to throttle valve (e.g., intake throttle) 20. The CAC may be an air-to-air or air-to-coolant heat exchanger, for example. Throttle valve 20 is coupled to engine intake manifold 122. From the compressor 14, the hot compressed air charge enters the inlet of the CAC 118, cools as it travels through the CAC, and then exits to pass through the throttle valve 20 to the intake manifold 122. In the embodiment shown in FIG. 1, the pressure of the air charge within the intake manifold is sensed by manifold absolute pressure (MAP) sensor 124 and a boost pressure is sensed by boost pressure sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Intake manifold 122 is coupled to a series of combustion chambers or cylinders 180 through a series of intake valves (not shown) and intake runners (e.g., intake ports) 185. As shown in FIG. 1, the intake manifold 122 is arranged upstream of all combustion chambers 180 of engine 10. Additional sensors, such as manifold charge temperature (MCT) sensor 33 and air charge temperature sensor (ACT) 25 may be included to determine the temperature of intake air at the respective locations in the intake passage. The air temperature may be further used in conjunction with an engine coolant temperature to compute the amount of fuel that is delivered to the engine, for example.

Each combustion chamber may further include a knock sensor 183 for identifying and differentiating abnormal combustion events, such as knock and pre-ignition. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116. Alternatively, a two-state exhaust gas oxygen sensor may be substituted for UEGO sensor 126.

As shown in FIG. 1, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through an emission control device 170. Depending on operating conditions, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 116. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 116 to downstream of the compressor 14. In some embodiments, the MCT sensor 33 may be positioned to determine the manifold charge temperature, wherein the charge may include air and exhaust recirculated through the EGR passage 151.

Intake manifold 122 may further include an intake gas oxygen sensor 34. In one example, the oxygen sensor is a UEGO sensor. The intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 34 is positioned downstream of throttle 20 and downstream of charge air cooler 118. However, in alternate embodiments, the oxygen sensor may be positioned upstream of the throttle. Intake oxygen sensor 34 may be used for estimating an intake oxygen concentration and inferring an amount of EGR flow through the engine based on a change in the intake oxygen concentration upon opening of the EGR valve 152. Likewise, intake oxygen sensor 34 may be used for estimating an intake oxygen concentration and inferring an engine dilution or a change in intake humidity based on a change in the intake oxygen concentration following an intake manifold water injection.

Combustion chamber 180 also receives water and/or water vapor via water injection system 60. Water from water injection system 60 may be injected into the engine intake or directly into the combustion chambers 180 by one or more of water injectors 45-48. As one example, water may be injected into intake manifold 122, upstream of throttle 20, via water injector 45. As another example, water may be injected into intake manifold 122, downstream of the throttle in one or more locations, via water injector 46. As yet another example, water may be injected into one or more intake runners (e.g., intake ports) 185 via water injector 48 (herein also referred to as port water injection), and/or directly into combustion chamber 180 via water injector 47 (herein also referred to as direct water injection).

Though only one representative injector 47 and injector 48 are shown in FIG. 1, each of combustion chamber 180 and intake runner 185 may include its own injector. In alternate embodiments, water injection system 60 may include water injectors positioned at one or more of these positions. For example, the engine may include only water injector 46, in one embodiment. In another embodiment, the engine may include each of water injector 46, water injectors 48 (one at each intake runner), and water injectors 47 (one at each combustion chamber). Different water injection parameters (such as water injection amount, timing, pulsing rate, etc.) may be selected for each water injector based on engine operating conditions (e.g., knock, dilution requirement, exhaust temperature control, and exhaust catalyst temperature) as described with reference to FIGS. 2 and 3.

Water injection system 60 may include a water storage tank 63, a water lift pump 62, a collection system 72, and a water filling passage 69. Water stored in water tank 63 is delivered to water injectors 45-48 via water passage 61 and conduits or lines 161. In embodiments that include multiple injectors, water passage 61 may contain a valve 162 (e.g., diverter valve, multi-way valve, proportioning valve, etc.) to direct water to the different water injectors via the corresponding conduits. Alternatively, each conduit (or water line) 161 may include respective valves within the water injectors 45-48, for adjusting water flow there-through. In addition to water lift pump 62, one or more additional pumps may be provided in conduits 161 for pressurizing the water directed to the injectors, such as in the conduit coupled to direct water injector 47.

Water storage tank 63 may include a water level sensor 65 and a water temperature sensor 67, which may relay information regarding water conditions to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. If the level of water in the water tank 63 is higher than a threshold level, it may be inferred that there is sufficient water available for injection, and accordingly water injection may be enabled by the controller. Else, if the level of water in the water tank 63 is lower than the threshold level, it may be inferred that there is insufficient water available for injection, and therefore water injection may be disabled by the controller.

In the depicted embodiment, water storage tank 63 may be manually refilled via water filling passage 69 and/or refilled automatically by the collection system 72 via water tank filling passage 76. Collection system 72 may be coupled to one or more vehicle components 74 so that the water storage tank can be refilled on-board the vehicle with condensate collected from various engine or vehicle systems. In one example, collection system 72 may be coupled with an EGR system and/or exhaust system to collect water condensed from exhaust passing through the system. In another example, collection system 72 may be coupled with an air conditioning system (not shown) for collected water condensed from air passing through an evaporator. In yet another example, collection system 72 may be coupled with an external vehicle surface to collect rain or atmospheric condensation. Manual filling passage 69 may be fluidically coupled to a filter 68, which may remove some impurities contained in the water. A drain 92 including a drain valve 91 may be used to drain water from the water storage tank 63 to a location outside the vehicle (e.g., onto the road), such as when a quality of the water is deemed to be lower than a threshold and not suitable for injection into the engine (e.g., due to high conductivity, high particulate matter content). In one example, the quality of the water may be assessed based on the output of a sensor coupled to water injection system 60, in water line 61. For example, the water quality may be assessed based on the output of a conductivity sensor, a capacitance sensor, optical sensor, turbidity sensor, density sensor, or some other type of water quality sensor.

As described previously, exhaust from the turbine 116 and the waste gate (not shown in FIG. 1) flows through the emission control device 170. In general, one or more emission control devices 170 may include one or more exhaust after-treatment catalysts configured to catalytically treat the exhaust flow, and thereby reduce an amount of one or more substances in the exhaust flow.

All or part of the treated exhaust from emission control device 170 may be released into the atmosphere via exhaust conduit 35. Emission control device 170 may be a diesel particulate filter (DPF), a three way catalyst (TWC), a NOx trap, a NOx catalyst, various other emission control devices, or combinations thereof. As an example, device 170 may be a selective catalytic reduction (SCR) system which operates to reduce NOx emissions by introducing a reductant, such as urea, into the exhaust gas stream. The emission control device 170 may also be referred to as exhaust catalyst and may further include a temperature sensor 171 that may be used for determining the temperature of the exhaust catalyst.

During an engine cold-start, the temperature of the exhaust catalyst (as determined by the temperature sensor 171, for example) may be below a threshold temperature. In one example, the threshold temperature may be a catalyst light-off temperature. The threshold temperature may also be referred to as a desired temperature. As described previously, when the exhaust catalyst temperature is below the light-off temperature, the exhaust catalyst may not be able to effectively treat the constituents of the exhaust gas. As a result, untreated exhaust gas may be released into the atmosphere. The inventors have recognized that it may be possible to rapidly increase the temperature of the exhaust catalyst light-off temperatures by activating the water injection system 60 to inject water into the intake manifold 122.

As an example, when the exhaust catalyst temperature is lower than the catalyst light-off temperature, one or more of the water injectors 45-48 may be activated to inject water into the intake. Initially, the amount of water injected may be small (e.g., a light mist) so that the engine does not flood. Thereafter, when the engine speed increases, the amount of water injected via the water injectors may be increased.

The effect of increasing the amount of water injected into the intake is two-fold. Firstly, increasing the amount of water injected may increase the water concentration in the exhaust and may cause water to get stored within the porous material of the exhaust catalyst. As such, the exhaust catalyst may include a core made of a ceramic monolith and a substrate having a porous honeycomb-like structure and water may accumulate in the porous honeycomb structure. As water gets accumulated within the exhaust catalyst, the momentum of the water molecules within the exhaust catalyst may be converted to heat energy. As a result, the exhaust catalyst may be heated up quickly. Mathematical equations shown below explain how the momentum of the water molecules gets converted to heat energy.

For example, the total energy of the water vapor injected into the engine consists of kinetic energy and internal energy and may be expressed mathematically as shown below in equation (1):

$$\text{Total Energy} = \text{Kinetic Energy} + \text{Internal Energy} \qquad (1)$$

where the kinetic energy of the of the water molecules within the exhaust derives from the translational energy of the system. Further, the internal energy of the water molecules within the exhaust is due to all of its individual molecule's motion resulting in translational energy, rotational energy, and vibrational energy.

Water is a triatomic element having all the three types of motion (translation, rotation, and vibration) as a means of storing internal energy. The translational energy of the system (e.g., the energy from the whole system, of water molecules moving together) may be mathematically expressed as equation (2) shown below:

$$KE_{system} = \tfrac{1}{2} m v_{rms}^2 \qquad (2)$$

where m is the total mass of water (m=M*n, where M is the molecular weight of water and n is the number of moles of water), and $v_{rms}$ is the root mean square of the velocity of molecules. The total energy of the injected water vapor is then transferred to the catalyst as water becomes absorbed within the catalyst. The collision and absorption of the water results in the catalyst heating up faster. Thus, the total energy of the water vapor is converted to heat energy that is applied to the exhaust catalyst.

The internal translation energy is the energy from individual molecular movement within the system and can be expressed mathematically in equation (3) as shown below:

$$\text{Energy}_{translational} = \tfrac{1}{2} m v^2 = 3/2 kT \qquad (3)$$

where m is the mass of the molecule, v is the velocity of the molecule, k is the Boltzmann constant, and T is the temperature in kelvin. It may be noted that a system can have internal translational energy but have no system translational energy, for example, gas if the gas was not flowing. The gas would still have a temperature above 0 K so it would still have internal translational energy, where the internal translational energy is related to this temperature through the equation (3).

The internal rotational energy is the energy due to the rotation of the particular molecule. Polyatomic molecules may rotate about the x, y, or z axes, or some combination of the three. The moments of inertia corresponding to these axes is: Ix,Iy,Iz or Ia,Ib,Ic. As such, the general equation for moment of inertia may be expressed as equation (4) shown below:

$$I = \Sigma_i m_i r_i^2 \qquad (4)$$

where the sum is over the atoms in the molecule (e.g. H_2 O has 3 atoms so i is 3), the mass of atom i is $m_i$, and the distance from the rotation axis is $r_i$. The general equation for rotational energy is shown in equation (5) below:

$$E_{rotational} = \tfrac{1}{2} I \omega^2 \qquad (5)$$

where ω is the angular frequency of the rotation.

The vibrational energy (internal) is the energy due to the vibration of the atoms in the molecule. Polyatomic molecules may vibrate in six different ways symmetrical stretching, asymmetrical stretching, scissoring (bending), rocking, wagging, and twisting. To a first approximation molecular vibrations can be approximated as simple harmonic oscillators, with an associated vibrational energy as illustrated below in equation (6):

$$E_{vibrational} = (V + \tfrac{1}{2}) h \nu \qquad (6)$$

where V is the vibrational quantum number, h is Planck's constant, and v is the vibrational frequency.

In this way, the momentum of the water molecules within the exhaust catalyst may be converted to heat energy. In addition, the water that is added to the exhaust catalyst may increase the capacitance of the exhaust catalyst which in turn results in the exhaust catalyst storing increased amount of the exhaust heat. As such, water has a high heat capacity and is a great material for absorbing heat. This is partially why it is utilized as a coolant in many thermal management systems. Water being stored within the catalyst may act like a conductor for the heat passing by in the exhaust allowing it to have a better transfer rate to the catalyst and allowing the catalyst to better store the exhaust heat. It may be appreciated that water has a high heat capacity. As such, the capability for a molecule to absorb heat energy is called heat capacity. Water's high heat capacity is a property caused by hydrogen bonding among water molecules. When heat is absorbed, hydrogen bonds are broken and water molecules can move freely. When the temperature of water decreases, the hydrogen bonds are formed and release a considerable amount of energy. Water has the highest specific heat capacity of any liquid. Specific heat is defined as the amount of heat one gram of a substance must absorb or lose to change its temperature by one degree Celsius. For water, this amount is one calorie, or 4.184 Joules.

Figure 3:
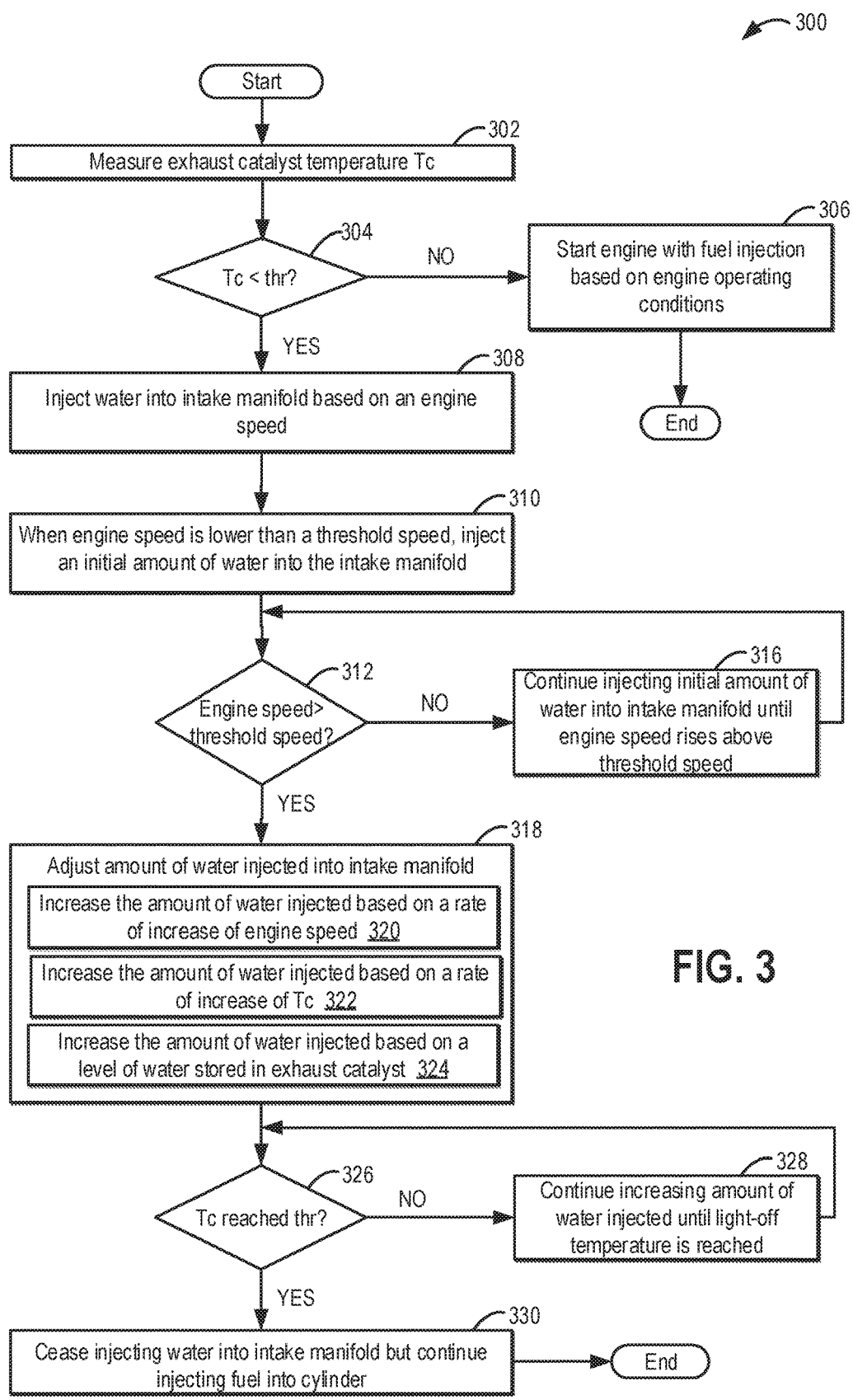
FIG. 3 depicts a flow chart of an example method for injecting water into an intake of the engine system during an engine cold-start when an exhaust catalyst temperature is lower than a threshold temperature, according to the present disclosure.
Figure 4:
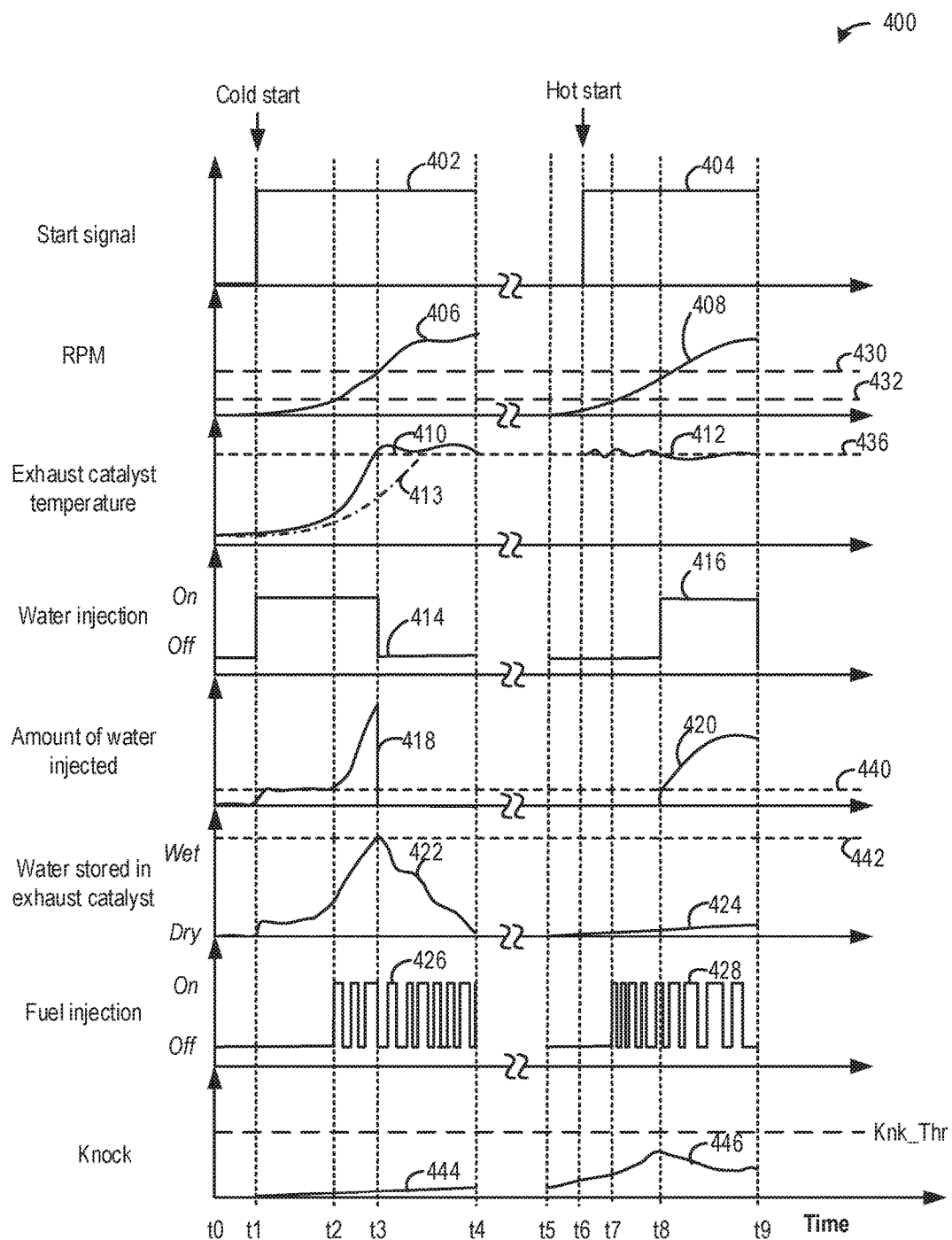
FIG. 4 shows a prophetic example of water injection adjustments applied during the engine cold-start to decrease a catalyst light-off time, according to the present disclosure.

These two effects, increased heat energy and increased capacitance for storing the heat, together decrease the time to light-off temperature of the exhaust catalyst, as illustrated in FIG. 3. As such, the amount of water injected into the intake may be adjusted based on one or more of an engine speed, the exhaust catalyst temperature, and a water storage capacity of the exhaust catalyst, as illustrated in FIG. 4 and described further below.

FIG. 1 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIG. 1, to receive input including transmission gear position, accelerator pedal position, brake demand, vehicle speed, engine speed, mass airflow through the engine, boost pressure, ambient conditions (temperature, pressure, humidity), etc. Other sensors include UEGO sensor (pre and/or post catalyst), HEGO sensor, CAC 118 sensors, such as CAC inlet air temperature, ACT sensor 25, exhaust pressure and temperature sensors 80, 82, exhaust catalyst temperature sensor 171, and pressure sensor 124, CAC outlet air temperature sensor, a profile ignition pickup signal (PIP) from Hall effect sensor 181 (or other type) coupled to a crankshaft, and MCT sensor 33, intake oxygen sensor (IAO2) 34, knock sensor 183 for determining ignition of end gases and/or water distribution among cylinders, humidity sensors, and others. The controller 12 receives signals from the various sensors of FIG. 1 and employs the various actuators of FIG. 1 to adjust engine operation based on the received signals and instructions stored on a memory of the controller.

As an example, the controller may activate the water injection system based on engine operating conditions. For example, the controller 12 may activate the water injectors 45-48 during an engine start when an exhaust catalyst temperature is below a threshold temperature (e.g., light-off temperature). The controller 12 may additionally control the amount of water injected via the water injectors during the engine start. As such, injecting water to the engine may include adjusting a pulse-width of injectors 45-48 to vary an amount of water injected while also adjusting a timing of the water injection and a number of injection pulses.

As another example, the controller 12 may adjust the amount of water injected into the intake via the water injectors 45-48 based on an engine speed during the engine cold-start when exhaust catalyst temperature is below the threshold. For example, the controller 12 may determine engine speed based on the PIP signal from the Hall effect sensor 181. During the engine cold-start, when the engine speed is below a threshold speed, the controller may inject a smaller amount of water (e.g., light mist) into the intake via the water injectors 45-48. As the engine speed increases and reaches the threshold speed, the controller may increase the amount of water injected into the intake. In one example, the controller may adjust the amount of water injected based on a rate of increase of engine speed.

In still other examples, the controller 12 may adjust the amount of water injected into the intake via the water injectors 45-48 based on an amount of water stored in the exhaust catalyst. For example, the controller 12 may estimate the amount of water stored in the exhaust catalyst based on the exhaust catalyst temperature (e.g., based on the output of the temperature sensor 171) and an amount of water injected into the intake (e.g., sum total of water injected using each of the water injectors 45-48). In some examples, the controller 12 may estimate the amount of water stored in the exhaust catalyst based on an output of a humidity sensor coupled to the exhaust catalyst. Herein, the controller 12 may increase the amount of water injected into the intake proportional to an increase in an estimated level of water stored in the exhaust catalyst.

In some more examples, the controller 12 may deactivate the water injectors when the exhaust catalyst reaches the light-off temperature. Based on the output of the temperature sensor 171, the controller may determine if the exhaust catalyst has reached light-off temperature (e.g., 400° C.-600° C.). Once the light-off temperature is reached, the controller may disable the one or more water injectors 45-48 and maintain the injectors disabled. At any time during the engine cycle, the controller may reactivate the water injectors for knock control, dilution, and exhaust temperature control as shown in FIG. 2.

In some examples, the storage medium may be programmed with computer readable data representing instructions executable by the processor for performing the methods described below (e.g., at FIGS. 2 and 3) as well as other variants that are anticipated but not specifically listed.

In this way, the system of FIG. 1 enables a system for a vehicle, comprising: an engine including a cylinder, a water injection system including a water injector coupled to an intake manifold, an exhaust catalyst coupled to an exhaust passage, a temperature sensor configured to measure a temperature of the exhaust catalyst, a sensor configured to measure an engine speed, and a controller including computer readable instructions for: during an engine start, activating the water injector to inject a mist of water into the intake manifold when the engine speed is below a threshold speed, and responsive to the engine speed rising above the threshold speed, increase an amount of water injected into the intake manifold based on a rate of increase of the temperature of the exhaust catalyst.

Figure 2:
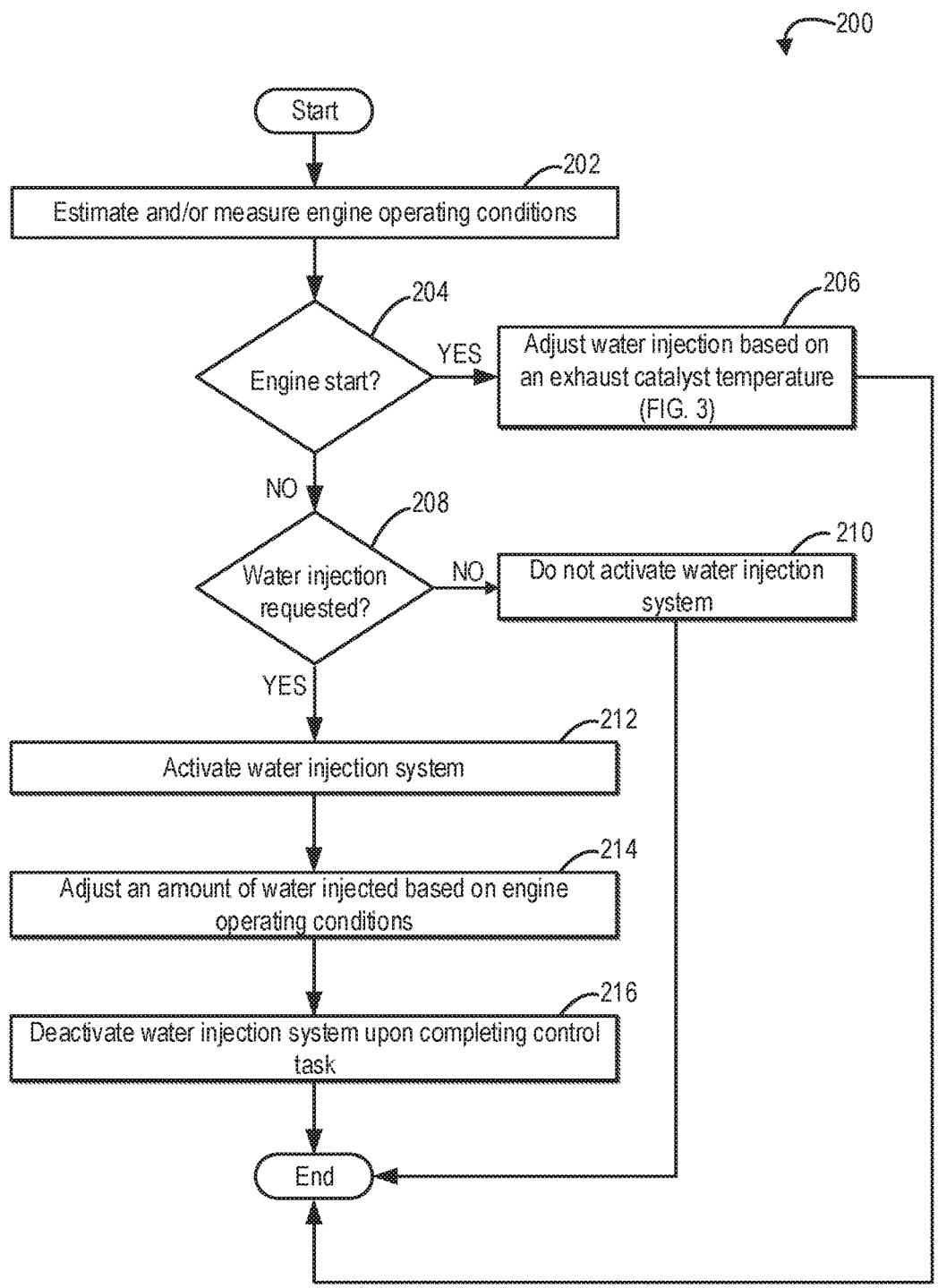
FIG. 2 depicts a flow chart of an example method for using a water injection system of the engine system for one or more of knock control, dilution requirement, and exhaust temperature control.

Turning now to FIG. 2, an example method 200 is shown for adjusting water injection from a water injection system into an intake of an engine system, responsive to various engine operating conditions. The water injection system may be one non-limiting example of the water injection system 60 shown in FIG. 1, and the engine system may be one non-limiting example of the engine system 100 shown in FIG. 1. Specifically, the method 200 includes selectively activating the water injection system to control performance of the engine.

Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 200 begins at 202 by estimating and/or measuring engine operating conditions. Engine operating conditions estimated may include intake manifold pressure (MAP), air-fuel ratio (A/F), spark timing, fuel injection amount or timing, an exhaust gas recirculation (EGR) rate, mass air flow (MAF), manifold charge temperature (MCT), an engine speed, coolant temperature, cylinder temperature, an exhaust catalyst temperature, a level of water stored in exhaust catalyst, and/or load, etc.

At 202, it may be determined if the engine is being started from rest. In one example, an engine start may be confirmed responsive to an ignition key-on event, or an alternate vehicle-on event. As another example, in engines configured with start-stop button, an engine start may be confirmed responsive to driver pressing the start button.

An engine start may not be confirmed if the engine has already surpassed engine cranking speed or is already running and nominal engine operation is continuing. If engine start is confirmed (e.g., "YES" at 204), then method 200 proceeds to 206 where water injection is adjusted based on an exhaust catalyst temperature, as illustrated in FIG. 3. In some examples, method 200 may end and the controller may proceed to execute the method described below with reference to FIG. 3.

Continuing on with FIG. 2, if an engine start is not confirmed at 204 (e.g., "NO" at 204), indicating that the engine is already running, method 200 proceeds to 208 where it may be determined if water injection is requested. Typically when the engine is being operated, water injection may be requested to perform control tasks such as knock control, exhaust temperature control, and to meet engine dilution demand.

In a first example, water injection may be requested when a knock sensor output (e.g., output of the knock sensor 183 shown in FIG. 1) moves towards a knock threshold. For example, when the output of the knock sensor moves closer to the knock threshold, activating the water injection system may increase charge air cooling and avert a knock condition. In a second example, water injection may be requested responsive to elevated exhaust temperatures wherein the charge cooling from the water enables exhaust temperature control. For example, water injection may be requested in response to the exhaust gas temperature rising above a threshold temperature. Herein, the threshold temperature may be a temperature above which degradation of engine components downstream of cylinders may occur. In a third example, water injection may be requested to meet engine dilution demand. In this way, water injection may be utilized for increasing engine dilution to decrease pumping losses, provide increased charge air cooling to reduce engine knock and increase engine efficiency.

In some examples, water injection may be requested in response to a manifold temperature being greater than a threshold level. Additionally, water injection may be requested when a threshold engine speed or load is reached. In addition, water may be injected when the inferred octane number of used fuel is below a threshold.

If water injection has not been requested (e.g., "NO" at 208), engine operation continues at 210 without injecting water. However, if water injection has been requested (e.g., "YES" at 208), then the method continues at 212 where the water injection system is activated. Activating the water injection system includes activating (e.g., sending an electrical signal to) one or more water injectors (such as water injectors 45-48 of FIG. 1, for example) of the water injection system.

Next, at 214, method 200 includes adjusting an amount of water injected based on the engine operating conditions. The controller may adjust the amount of water injected and a duration of water injection based on feedback from a plurality of sensors, which provide information about various engine operating parameters. These parameters may include engine speed and load, spark timing, ambient conditions (e.g., ambient temperature and humidity), exhaust temperature, a fuel injection amount and/or knock history (based on the output of knock sensors coupled to or near the engine cylinders).

In some examples embodiments, before injecting water into the engine system the controller may check water availability for injection. As such, the water availability may be determined based on the output of a plurality of sensors, such as water level sensor and/or water temperature sensor (such as water level sensor 65 and water temperature sensor 67 shown in FIG. 1) disposed in a water storage tank of a water injection system of the engine. If water is not available for injection, the controller may adjust engine operating parameters without injecting water.

Next, at 216, method 200 includes deactivating or disabling water injection system upon completion of the control task. For example, water injection may stopped when the knock sensor output moves away from the knock threshold. In another example, water injection may be stopped responsive to exhaust temperatures falling below the threshold temperature. In yet another example, water injection may be stopped when the engine dilution demand has been met.

Other examples where water injection may be stopped in response to one or more of the manifold temperature being lower than the threshold level, when engine speed is lower than the threshold speed and when engine load is light (e.g., when load is lower than a threshold load). Method 200 ends.

As illustrated in FIG. 2, the controller may adjust water injection for one or more of knock control, dilution demand, and exhaust temperature control. It may be appreciated that the water injection described thus far is performed while the engine is already being operated or is running. It may be possible to operate the water injection system during an engine start, as described below with reference to FIG. 3, to reduce catalyst light-off times.

Engine exhaust catalysts (such as exhaust catalyst 170 shown in FIG. 1) exist in engine systems to oxidize and reduce exhaust constituents. The exhaust catalysts are known to be highly efficient after being heated to catalyst light-off or operation temperatures (e.g., 400° C. to 600° C.). However, during an engine cold-start-up, when the exhaust catalyst is at a temperature below the light-off temperature, the catalyst is ineffective or inefficient in oxidizing the abundant hydrocarbons in the exhaust. The inventors have recognized that a dry exhaust catalyst (like one in a cold-start) takes longer to heat up from ambient temperature to light-off temperature than a wet catalyst. This is because water in the wet catalyst is able to absorb more heat at a faster rate than a dry catalyst. Thus, during the cold-start when the exhaust catalyst temperature is below the light-off temperature, water is injected into the intake to make the catalyst wet and enable rapid heating of the catalyst as shown below in FIG. 3.

Turning now to FIG. 3, an example method 300 for injecting water into an intake of an engine system during an engine start is shown. Specifically, method 300 includes injecting water during the engine start when an exhaust catalyst temperature is below a threshold temperature. In one example, the method of FIG. 3 may be performed as part of the method of FIG. 2, such as at 206. In another example, the method of FIG. 3 may be performed independent of the method of FIG. 2 during an engine start when the exhaust catalyst temperature is below the threshold temperature.

Method 300 begins at 302 where the method includes estimating and/or measuring exhaust catalyst temperature, Tc. Herein, the temperature of an emission control device or exhaust catalyst, (such as exhaust catalyst 170 of FIG. 1, for example) may be estimated. The temperature of the exhaust catalyst may be estimated based on one or more of a catalyst model, an engine event number, and a duration of engine operation. In one example, the exhaust catalyst temperature may be directly measured via a catalyst temperature sensor (such as temperature sensor 171 coupled to the exhaust catalyst 170, for example). In a second example, the controller may estimate the exhaust catalyst temperature based on one or more of a temperature of the exhaust catalyst at last engine shut-down, a current ambient temperature, historical weather data, and a duration since last engine shut-down.

In one example, the controller may retrieve the temperature of the exhaust catalyst at the last engine shut down from the memory of the controller. As such, during an engine shut down, the controller may estimate the exhaust catalyst temperature from the output of the exhaust catalyst temperature sensor, for example, and further store the exhaust catalyst temperature in the memory. During a subsequent start-up (with no engine start in between), the controller may retrieve the exhaust catalyst temperature at previous shut down from the memory. The controller may additionally determine the current ambient temperature based on the output of an ambient temperature sensor, for example. Further, the controller may look-up the average temperature reading based on historical weather data. Furthermore, the controller may determine how long the engine has been shut-down (from the time between engine start signals, for example). Using the exhaust catalyst temperature at last shut-down as a starting value, the controller may be able determine the exhaust catalyst temperature during the current engine start using the current ambient temperature, weather data, and the duration since the last engine shut-down. The controller may alternatively determine the exhaust catalyst temperature during the current engine start based on a calculation using a look-up table with the input being exhaust catalyst temperature at last shut-down, current ambient temperature, weather data, and the duration since the last engine shutdown.

As another example, the controller may make a logical determination (e.g., regarding the current exhaust catalyst temperature) based on logic rules that are a function of parameters such as exhaust catalyst temperature at last shut-down, current ambient temperature, weather data, and the duration since the last engine shutdown.

In example embodiments where method 300 is performed independent of method 200 during an engine start, in addition to the exhaust catalyst temperature, method 300 may include estimating and/or measuring additional engine operating parameters as illustrated at 202 of method 200. Briefly, at 302, method 300 may include estimating and/or measuring engine operating conditions such as manifold pressure (MAP), air-fuel ratio (A/F), spark timing, fuel injection amount or timing, an exhaust gas recirculation (EGR) rate, mass air flow (MAF), manifold charge temperature (MCT), an engine speed, coolant temperature, cylinder temperature, a level of water stored in exhaust catalyst, and/or load, etc.

Next, at 304, it may be determined if the estimated or measured exhaust catalyst temperature is below a threshold temperature Tc. In some examples, during an engine start when the exhaust catalyst temperature is below Tc, a controller (such as controller 12 of FIG. 1) may deduce that the engine start is a cold-start. In one example, the threshold temperature Tc may be a catalyst light-off temperature below which the exhaust catalyst is not activated. Thus, it may be desired to warm up the exhaust catalyst temperature to the threshold temperature to ensure optimal catalyst operation and catalytic conversion of exhaust components. As elaborated herein, the controller may be configured to inject water into an engine intake, and adjust an amount of water injected via one or more water injectors based on one or more of an engine speed, the exhaust catalyst temperature, and a level of water stored within the exhaust catalyst. In doing so, the exhaust catalyst temperature may be increased rapidly to the threshold temperature, during an engine cold-start as described below.

If the exhaust catalyst temperature is higher than the threshold temperature Tc (e.g., "NO" at 304), indicating that the engine start is a hot start, method 300 proceeds to 306 where the engine is started in normal engine start mode. As such, the normal engine start mode may include activating fuel injectors and adjusting fueling based on predetermined engine operation parameters. In one example, the controller may activate the fuel injectors and begin fueling based on parameters such as engine speed, load, torque demand, etc. It may be noted that the controller may not activate the water injectors during the hot engine start when the exhaust catalyst temperature is higher than the threshold temperature Tc. Method 300 ends.

However, if the exhaust catalyst temperature is lower than the threshold temperature Tc (e.g., 'YES" at 304) indicating that the engine start is a cold-start, method 300 proceeds to 308 where water is injected into intake manifold based on an engine speed. Before the engine was started, the exhaust catalyst may be dry (e.g., water stored within the porous material of the exhaust catalyst is at or near zero). However, when water is injected into the intake manifold, water concentration in the exhaust may be increased and as a result, water molecules present in the exhaust may begin to accumulate within the porous material of the exhaust catalyst. Thus, the exhaust catalyst may become wet (e.g., level of water stored in the porous material of the exhaust catalyst >0). The technical effect of wetting the exhaust catalyst during the engine cold-start is that the capacitance of the exhaust catalyst may be increased. Increased capacitance may result in increased capacity to store exhaust heat. Additionally, the momentum of the water molecules stored within the exhaust catalyst may be converted to heat energy. Together, the increased capacitance and the conversion of momentum to heat results in heating up the exhaust catalyst. Thus, by injected water into the intake manifold during an engine cold-start, the exhaust catalyst may be heated up quickly.

Injecting water into the intake may include activating (e.g., actuating via a signal sent from the controller) one or more water injectors (such as water injectors 45-48 of FIG. 1, for example) of a water injection system (such as water injection system 60 of FIG. 1). In addition, the controller may determine a control signal (such as a pulse width) to be sent to the water injector actuator based on the engine speed. As such, the controller may determine engine speed based on a PIP signal from a sensor (such as the Hall effect sensor 181 of FIG. 1, for example) coupled to the crankshaft. The controller may determine the pulse width through a determination that directly takes into account a determined engine speed, such as increasing the pulse width with increasing engine speed. The controller may alternatively determine the pulse width based on a calculation using a look-up table with the input being engine speed and the output being pulse-width.

Injecting water into the intake manifold may include injecting an initial amount of water into the intake manifold when engine speed is below a threshold speed at 310. In one example, the threshold speed may be an engine cranking speed. During the engine start, when the engine speed is below the threshold speed, the controller may inject a smaller amount of water (e.g., light mist) into the intake via the water injectors. By injecting a light mist of water when the engine speed is lower than the threshold speed, engine flooding may be reduced.

Next, at 312, method 300 includes determining if the engine speed is greater than the threshold speed. If the engine speed is still lower than the threshold speed (e.g., "NO" at 312), then method 300 proceeds to 316 where the controller may continue to inject the initial amount (e.g., light mist) of water into the intake manifold and method returns to 312.

However, if the engine speed is higher than the threshold speed (e.g., "YES" at 312), then method 300 proceeds to 318 where the controller adjusts an amount of water injected into the intake manifold. In some examples, the controller may begin engine fueling once the engine reaches the cranking speed. As such, the controller may adjust the amount of fuel injected based on engine operating conditions such as engine load, engine speed, torque demand, etc.

While continuing fuel injection, the controller may adjust the amount of water injected into the intake manifold based on the engine speed. For example, the controller may increase the amount of water injected based on a rate of increase of engine speed at 320. For example, as the engine speed increases, the controller may estimate a rate of increase of engine speed over a period. Based on the estimated rate of increase of engine speed, the controller may increase the amount of water. Herein, the amount of water injected into the intake manifold may be increased proportionally to the rate of increase of engine speed. In this way, during an engine cold-start, the method may include activating the water injector to inject a mist of water into the intake manifold when the engine speed is below a threshold speed and responsive to the engine speed rising above the threshold speed, increase an amount of water injected into the intake manifold based on a rate of increase of the temperature of the exhaust catalyst.

Additionally or alternatively, adjusting the amount of water injected into the intake manifold may include increasing the amount of water injected based on a rate of increase of exhaust catalyst temperature Tc at 322. As described previously, when water is injected into the intake manifold, the increased capacitance of the exhaust catalyst coupled with the increased amount of heat energy produced within the exhaust catalyst causes the exhaust catalyst temperature to increase. As the exhaust catalyst temperature increases, the controller may estimate the rate of increase of exhaust catalyst temperature. In one example, the controller may estimate the rate of increase of exhaust catalyst temperature based on one or more of the amount of water injected into the intake, a heat capacity of the exhaust catalyst, and a capacitance of the exhaust catalyst. Upon estimating the rate of increase of exhaust catalyst temperature, the controller may then increase the amount of water injected into the intake proportional to the rate of increase of exhaust catalyst temperature.

Additionally or alternatively, the controller may adjust the amount of water injected in the intake manifold based on a level of water stored in the exhaust catalyst at 324. The controller may estimate the level of water stored in the exhaust catalyst based on one or more of an exhaust temperature, the exhaust catalyst temperature, amount of water injected into the intake, an output of a humidity sensor, and the heat capacity of the exhaust catalyst.

Additional parameters such as HEGO dilution and UEGO dilution may be used to estimate water storage within the catalyst as illustrated below.

In one example, the controller may estimate water stored within the exhaust catalyst by subtracting water dilution seen by HEGO from the amount of water injected into the intake. If no water is absorbed by the catalyst then the HEGO will see all that water comes across as dilution for its O2 reading. However, if catalyst absorbs all the water then HEGO will not see any dilution for the O2 reading after water is injected into the intake, for example.

In another example, the controller may estimate water stored within the exhaust catalyst from each of UEGO dilution and HEGO dilution. For example, the controller may estimate water stored within the catalyst as a difference of amount of dilution seen by UEGO pre-catalyst and water dilution seen by HEGO post catalyst. As such, if no water is absorbed by the catalyst then the HEGO will see the same amount of dilution due to water as the UEGO will see. If catalyst absorbs all the water then UEGO will see dilution for the O2 reading but the HEGO will see less dilution from the water since the catalyst will have absorbed it.

In yet another example, the amount of water stored within the exhaust catalyst may be estimated based in UEGO dilution post catalyst instead of HEGO. For example, the amount of water stored within the catalyst may be estimated by subtracting water dilution seen by UEGO from the amount of water injected into the intake. For example, if no water is absorbed by the catalyst then the UEGO will see all that water comes across as dilution for its O2 reading. However, if catalyst absorbs all the water then UEGO will not see any dilution for the O2 reading after water is injected into the intake.

In still other examples, the amount of water stored within the exhaust catalyst may be estimated based on dilution seen by UEGO. For example, the amount of water absorbed by catalyst may be estimated by subtracting the water dilution seen by UEGO post catalyst from the amount of dilution seen by UEGO pre-catalyst. For example, if no water is absorbed by the catalyst then the UEGO post catalyst will see the same amount of dilution due to water as the UEGO pre-catalyst will see. If catalyst absorbs all the water then UEGO pre-catalyst will see dilution for the O2 reading but the UEGO post-catalyst will see less dilution from the water since the catalyst will have absorbed it.

In more examples, the amount of water absorbed by catalyst may be determined based on one or more UEGO and UEGO variable voltage (VVs) measurement. For example, the amount of water absorbed by catalyst may be determined by subtracting $O_2$ contribution seen from $H_2O$ dissociation seen by UEGO post catalyst from amount of $O_2$ contribution seen from $H_2O$ dissociation seen by UEGO pre-catalyst. As such, the VVs may be used to estimate water levels in the exhaust pre and post catalyst.

In one example, the controller may adjust the amount of water injection based on the level of water stored within the exhaust catalyst. For example, the controller may determine a control signal to send to the water injector actuator, such as a pulse width of the signal being determined based on a determination of the water stored within the exhaust catalyst. The water stored within the exhaust catalyst may be based on a measured humidity, or determined based on one or more of the exhaust temperature (determined from temperature sensor coupled to the exhaust passage, for example), the exhaust catalyst temperature (determined from output of exhaust catalyst temperature, for example), amount of water injected into the intake (determined based on water level in water tank, for example), humidity (determined based on output of humidity sensor coupled to exhaust manifold), and the heat capacity of the exhaust catalyst. The controller may determine the pulse width through a determination that directly takes into account a determined level of water stored in the catalyst, such as increasing the pulse width with increasing water level. The controller may alternatively determine the pulse width based on a calculation using a look-up table with the input being water level stored in exhaust catalyst and the output being pulse-width.

As another example, the controller may make a logical determination (e.g., regarding a position of actuator of the water injectors) based on logic rules that are a function of parameter level of water stored in exhaust catalyst. The controller may then generate a control signal that is sent to actuator of the water injectors.

In one example, the amount of water to be delivered via port and direct injectors is empirically determined and stored in a predetermined lookup tables or functions. For example, one table may correspond to determining port injection amounts and one table may correspond to determining direct injections amounts. The two tables may be indexed to engine operating conditions, such as level of water stored in exhaust catalyst, among other engine operating conditions.

For example, as the water is injected into the intake, the amount of water that is stored within the porous material increases. The controller may estimate the level of amount stored within the exhaust catalyst and accordingly increase the amount of water injected into the intake. Herein, the amount of water injected into the intake manifold may be increased proportional to a rate of increase of level of water stored within the exhaust catalyst.

As described so far, the amount of water injected in to the intake is adjusted based on one or more of the engine speed, exhaust catalyst temperature, and the level of water stored within the exhaust catalyst. Mathematically, the amount of water injected $W_{inj}$ may be represented by equation (7) as shown below:

$$W_{inj} = F1(w, dw/dt, Tc, dTc/dt, W_{stored}, dW_{stored}/dt) \quad (7)$$

where F1 is a function, w is the engine speed, dw/dt is the rate of change of engine speed, Tc is the exhaust catalyst temperature, dTc/dt is the rate of change of exhaust catalyst temperature, $W_{stored}$ is the level or amount of water stored in the exhaust catalyst, and $dW_{stored}/dt$ is the rate of change of level of water stored in the exhaust catalyst. In this way, by adjusting the amount of water injected based on one or more of the exhaust catalyst temperature, the engine speed and the level of water stored within the catalyst, the temperature of the exhaust catalyst may be increased rapidly. It may be appreciated that the controller perform the adjusting of water injection while continuing to fuel the engine system.

Next, at 326, method 300 includes determining if the exhaust catalyst temperature Tc has reached the threshold temperature. The threshold temperature may be the light-off temperature of the exhaust catalyst. If the exhaust catalyst temperature has not reached the threshold temperature (e.g., "NO" at 326), then method 300 proceeds to 328 where the controller may continue to increase amount of water injected into the intake manifold as described at 318 of method 300. As such, the amount of water injected into the intake may be continued until the exhaust catalyst temperature reaches the threshold temperature, thus, method 300 returns to 326.

However, if the exhaust catalyst temperature has reached the threshold temperature (e.g., "YES" at 326), then method 300 proceeds to 330 where the controller ceases water injection. In some examples, the controller may stop water injection when the engine speed reaches an optimal speed. The optimal speed may be estimated based on one or more of the exhaust catalyst light-off temperature, and level of water stored it the exhaust catalyst. In some more examples, the controller may water injection when the level of water estimated to be stored in the catalyst reaches the threshold level. Herein, the threshold level may be further estimated based on one or more of the exhaust catalyst light-off temperature, property of exhaust catalyst, and the engine speed.

Stopping water injection may include deactivating the one or more water injectors of the water injection system. Additionally, the controller may continue to maintain the fuel injectors active even after disabling the water injectors. Thus, the controller may continue to inject fuel into the cylinder based on engine operating conditions. Method 300 ends.

In this way, during an engine cold-start, fuel may be injected into the cylinder while injecting an initial amount of water into the intake manifold of the engine, both of which may be continued on until the exhaust catalyst temperature reaches the threshold temperature. As such, the amount of water injected into the intake manifold may be adjusted based on one or more of the engine speed, the exhaust catalyst temperature, and the level of water stored in the exhaust catalyst. The technical effect of injecting water into the intake during the cold-start is to accumulate water within the exhaust catalyst and convert the momentum of stored water molecules into heat. In this way, exhaust catalyst may be rapidly heated to light-off temperature during the engine cold-start.

Turning now to FIG. 4, map 400 illustrates water injection strategies used during an engine cold-start and an engine hot start. Plots 402 and 404 show start signal during different set of conditions (e.g., engine cold-start and engine warm start). Plots 406 and 408 show engine speed or rpm while plots 410 and 412 show exhaust catalyst temperature during the corresponding conditions. Plots 414 and 416 show water injection signal during the corresponding conditions. Plots 418 and 420 show water injection amounts while plots 422 and 424 show water stored in exhaust catalyst during the corresponding conditions. Plots 426 and 428 show fuel injections during the corresponding conditions. Plots 444 and 446 show knock sensor output during the corresponding conditions. For each plot, time is depicted along the x (horizontal) axis while values of each respective parameter are depicted along the y (vertical) axis.

Between t0 and t1, the engine is shut-down. At t1, a start signal (plot 402) is received. However, the exhaust catalyst temperature (plot 410) is below a threshold temperature 436. In one example, the threshold temperature may be the catalyst light-off temperature or operation temperature. A controller (such as controller 12 of FIG. 1) may deduce that the engine start at time t1 is a cold-start and accordingly activate a water injection system (plot 414). Activating the water injection system, may include activating one or more water injectors coupled to the engine system.

Between t1 and t2, the engine speed (plot 406) is below a threshold speed 432. Consequently, the controller may inject a smaller initial amount of water (plot 418) into an intake manifold of the engine system. Injecting the initial amount of water into the intake may include adjusting a pulse width signal of the water injectors to inject the desired amount of water into the intake manifold. In one example, the initial amount of water injected may be maintained at a constant level 440. As water is injected into the intake manifold, water may begin to accumulate in the exhaust catalyst (plot 422). As a result, the exhaust catalyst which was dry before time t1, may begin to get wet between time t1 and t2. As water begins to get accumulated within the exhaust catalyst, capacitance of the catalyst may be increased. Additionally, the momentum of the water molecules stored in the exhaust catalyst may be converted to heat energy. As a result, the exhaust catalyst may begin to warm up as seen as an increase in exhaust catalyst temperature (plot 410).

At time t2, the engine speed reaches the threshold speed 432 (e.g., cranking speed). Once the engine reaches cranking speed, the controller may start increasing the amount of water injected (plot 418) into the intake manifold. In addition, the controller may begin fuel injection (426) by activating one or more fuel injectors coupled to the engine system. Thus, water may be injected into the intake manifold while injecting fuel into the engine cylinders.

Between time t2 and t3, the amount of water injected into the intake manifold may be increased. In one example, the amount of water injected (plot 418) into may be increased proportional to an increase in the engine speed (plot 406). As such, the controller may estimate engine speed based on a PIP signal from a sensor (such as the Hall effect sensor 181 of FIG. 1, for example) coupled to the crankshaft. The controller may increase the pulse width of the water injector proportional to the rate of increase in engine speed. As an example, a slope of plot 418 may be similar to the slope of plot 406.

In another example, the amount of water injected (plot 418) into may be increased proportional to an increase in exhaust catalyst temperature (plot 410). Herein, a slope of plot 418 may be similar to the slope of plot 410. As described previously, when water is injected into the intake manifold, the increased capacitance of the exhaust catalyst coupled with the increased amount of heat energy produced within the exhaust catalyst causes the exhaust catalyst temperature to increase. As the exhaust catalyst temperature (plot 410) increases, the controller may estimate the rate of increase of exhaust catalyst temperature, from the slope of plot 410, for example. In another example, the controller may estimate the rate of increase of exhaust catalyst temperature based on one or more of the amount of water injected into the intake, a heat capacity of the exhaust catalyst, and a capacitance of the exhaust catalyst.

In yet another example, the amount of water injected (plot 418) into may be increased proportional to a rate of increase of amount of water stored in the exhaust catalyst (plot 422). The controller may estimate the level of water stored in the exhaust catalyst (plot 422) based on one or more of an exhaust temperature, the exhaust catalyst temperature, amount of water injected into the intake, and the heat capacity of the exhaust catalyst. As illustrated previously, the controller may estimate the amount of water injected into the intake based on one or more of the amount of dilution seen by the HEGO, the amount of dilution seen by the UEGO, and the amount of O2 seen by the UEGO as a result of VVs dissociating water. The controller may adjust the slope of plot 418 to be similar to the slope of plot 422.

In this way, the controller may be able to inject water into the intake manifold during the engine cold-start to achieve exhaust catalyst heating. As the amount of water injected into the intake manifold is increased between t2 and t3, fuel is also injected into the engine cylinder (plot 426). The controller may adjust a number of injections, a pulse width of fuel injection, and an amount of fuel injected based on engine operating conditions such as engine speed, engine load, torque, etc. In engine systems having direct injection and port fuel injection capabilities, the controller may additionally adjust a ratio and timing of the fuel direct and port fuel injections based on the engine operating conditions.

At time t3, the exhaust catalyst temperature (plot 410) reaches the threshold temperature 436. As seen in map 400, if water injection is not used during cold-start of the engine, the exhaust temperature may reach catalyst light-off temperatures more gradually as shown by plot 413. However, by injecting water into the intake manifold, the exhaust catalyst temperature (plot 410) reaches light-off temperature faster (compare plots 410 and 413).

Once the exhaust catalyst reaches the threshold temperature, it may be able to effectively treat the exhaust gas and thereby reduce exhaust emissions. Thus, at time t3, the water injection (plot 414) may be turned off. Turning off water injection may include deactivating one or more water injectors coupled to the engine system. In some examples, the water injection may be turned off when the water stored in the exhaust catalyst reaches a threshold level 442. As such, the threshold level may be estimated based on one or more of catalyst light-off temperature (threshold 436), and engine speed (plot 406). In some more examples, the water injection may be turned off when the engine speed reaches a threshold speed 430. As such, the threshold speed 430 may be estimated based on one or more of catalyst light-off temperature (threshold 436), and level of water stored in exhaust catalyst (plot 442). Once the water injection is turned off, the level of water stored in the exhaust catalyst (plot 422) gradually decreases until the level becomes close to zero (e.g. catalyst is dry). Even though the water injection is turned off (plot 414) at time t3, the fuel injection (plot 426) is maintained between t3 and t4.

Another engine start is shown between time t5 and t9. Specifically, between time t5 and t6, the engine is shut down and engine start signal (404) is received at time t6. The controller may estimate and/measure exhaust catalyst temperature (412). Since the exhaust catalyst temperature is at or near the threshold temperature 436, the controller may deduce that the engine start is not a cold-start but is a hot start. Accordingly, the controller may not activate the water injectors of the water injection system at time t6. The controller may monitor the engine speed (408) and at time t7, when the engine speed reaches the threshold 432 (e.g., cranking speed), the controller may activate the fuel injectors and begin engine fueling (plot 428). Thus, during a hot start, the controller may maintain the water injectors deactivated, and activate the fuel injectors to inject fuel based on engine operating conditions.

Between time t7 and t8, the water injectors are maintained deactivated, and the fuel injectors are maintained activate. However, at time t8, the knock sensor output (plot 446) may increase and move towards the knock threshold Knk_Thr (e.g., due to increased load). Consequently, the controller may turn on water injection (416) for knock control. Between time t8 and t9, water injection amount (plot 420) may be adjusted so as to provide knock relief.

At time t9, the knock sensor output (plot 446) moves away from the knock threshold Knk_Thr. Consequently, the water injection system may be turned off (plot 416).

In this way, by injecting water during an engine cold-start, exhaust emissions may be reduced by decreasing catalyst light-off time. Thus, cold-start emissions may be reduced using existing water injection systems without increasing manufacturing costs and complexity. The technical effect of injecting water into the intake manifold during an engine cold-start is that the water which is accumulated within the exhaust catalyst generates heat within the exhaust catalyst and thereby heats up the exhaust catalyst to light-off temperatures more rapidly.

A method includes during a cold-start, injecting water into an intake of an engine based on a temperature of an exhaust catalyst. In a first example of the method, injecting the water may include injecting the water into the intake while injecting fuel into a cylinder of the engine via a fuel injector coupled to one or more of the cylinder and an intake manifold, wherein injecting the water into the intake includes injecting the water via a water injector coupled to one or more of the intake manifold and the cylinder. A second example of the method optionally includes the first example and further includes delivering an initial amount of water into the intake in response to one or more of the temperature of the exhaust catalyst being lower than a threshold temperature and an engine speed being lower than a threshold speed. A third example of the method optionally includes one or more of the first and second examples, and further includes adjusting an amount of water injected into the intake in response to one or more of the temperature of the exhaust catalyst rising above the threshold temperature and the engine speed rising above the threshold speed. A fourth example of the method optionally includes one or more of the first through third examples, and further includes increasing the amount of water injected into the intake proportional to a first rate of increase of the engine speed until the engine speed reaches a desired speed. A fifth example of the method optionally includes one or more of the first through fourth examples, and further includes increasing the amount of water injected into the intake proportional to a second rate of increase of the temperature of the exhaust catalyst until the temperature of the exhaust catalyst reaches a desired temperature. A sixth example of method optionally includes one or more of the first through the fifth examples, and further includes wherein the desired temperature of the exhaust catalyst is a light-off temperature of the exhaust catalyst. A seventh example of method optionally includes one or more of the first through the sixth examples, and further includes ceasing the injecting of the water into the intake while continuing to inject fuel into the cylinder of the engine in response to one or more of the temperature of the exhaust catalyst reaching the light-off temperature and the engine speed reaching the desired speed.

The systems and methods described above provide for a method comprising: during an engine cold-start condition, injecting fuel into a cylinder of an engine while injecting an initial amount of water into an intake manifold of the engine, continuing the injecting of the initial amount of water until an engine speed reaches a threshold speed and thereafter adjusting an amount of injected water based on a level of water stored within an exhaust catalyst. In a first example of the method, the method may additionally or alternatively includes wherein the adjusting includes increasing the amount of injected water to proportionally increase the level of water stored in the exhaust catalyst, the increasing continued until the level of water stored in the exhaust catalyst reaches a threshold level. A second example of the method optionally includes the first example, and further includes wherein the adjusting further includes increasing the amount of water injected into the intake manifold to increase a temperature of the exhaust catalyst to a light-off temperature. A third example of the method optionally includes one or more of the first and the second examples, and further includes wherein the adjusting further includes stopping water injection into the intake manifold when one or more of the level of water stored in the exhaust catalyst reaches the threshold level and the temperature of the exhaust catalyst reaches the light-off temperature. A fourth example of the method optionally includes one or more of the first through the third examples, and further includes continuing to inject the fuel into the engine cylinder when the water injection into the intake manifold has stopped.

The systems and methods described above provide for a system comprising: an engine including a cylinder, a water injection system including a water injector coupled to an intake manifold, an exhaust catalyst coupled to an exhaust passage, a temperature sensor configured to measure a temperature of the exhaust catalyst, a speed sensor configured to measure an engine speed, and a controller including computer readable instructions for: during an engine cold-start, activating the water injector to inject a mist of water into the intake manifold when the engine speed is below a threshold speed, and responsive to the engine speed rising above the threshold speed, increase an amount of water injected into the intake manifold based on a rate of increase of the temperature of the exhaust catalyst. In a first example of the system, the system may additionally or alternatively include wherein the controller includes further instructions for: deactivating the water injector to stop injecting water into the intake manifold responsive to the temperature of the exhaust catalyst reaching an operational temperature. A second example of the system optionally includes the first example, and further includes wherein the controller includes further instructions for: increasing the amount of water injected into the intake manifold proportional to an increase in a level of water stored in the exhaust catalyst. A third example of the system optionally includes one or more of the first and the second examples, and further includes wherein the controller includes further instructions for: deactivating the water injector to stop injecting water into the intake manifold responsive to the level of water stored in the exhaust catalyst reaching a threshold level. A fourth example of the system optionally includes one or more of the first through the third examples, and further includes wherein the controller includes further instructions for: estimating the threshold level based on a capacitance of the exhaust catalyst and a heat capacity of the exhaust catalyst. A fifth example of the system optionally includes one or more of the first through the fourth examples, and further includes a fuel injector configured to inject fuel into the cylinder and wherein the controller includes further instructions for: activating the fuel injector while activating the water injector. A sixth example of the system optionally includes one or more of the first through the fifth examples, and further includes wherein the controller includes further instructions for: maintaining the fuel injector active while deactivating the water injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

In another representation, the systems and methods described above provide for a method comprising: during a first engine start, activating each of a water injector to inject water into an intake and a fuel injector to inject fuel into an engine cylinder and adjusting water injection based on one or more of an engine speed, an exhaust catalyst temperature, and a level of water stored in an exhaust catalyst, and during a second engine start, activating only the fuel injector to inject fuel into a cylinder of an engine and not activating the water injector. In a first example of the method, the method may additionally or alternatively includes wherein the first engine start is cold start where the exhaust catalyst temperature is below a threshold temperature and the second engine start is a hot start where the exhaust catalyst temperature is higher than the threshold temperature. A second example of the method optionally includes the first example, and further includes wherein during the first engine start, the water injector is activated when the engine speed is below a threshold speed, and the fuel injector is not activated when the engine speed is below the threshold speed. A third example of the system optionally includes one or more of the first and the second examples, and further includes wherein during the first engine start, the fuel injector is activated once the engine speed reaches the threshold speed.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during a cold-start:
      injecting fuel into a cylinder of an engine via a fuel injector; and
      injecting water into the cylinder of the engine via a water injector based on a temperature of an exhaust catalyst while the cylinder is combusting fuel.

2. The method of claim 1, wherein the fuel injector is coupled to one or more of the cylinder and an intake manifold, and wherein the water injector is coupled to one or more of the intake manifold and the cylinder.

3. The method of claim 2, wherein injecting water into the cylinder includes delivering an initial amount of water into the cylinder in response to one or more of the temperature of the exhaust catalyst being lower than a threshold temperature and an engine speed being lower than a threshold speed.

4. The method of claim 3, further comprising adjusting an amount of water injected into the cylinder in response to one or more of the temperature of the exhaust catalyst rising above the threshold temperature and the engine speed rising above the threshold speed.

5. The method of claim 4, wherein the adjusting further comprises increasing the amount of water injected into the cylinder proportional to a first rate of increase of the engine speed until the engine speed reaches a desired speed.

6. The method of claim 5, wherein the adjusting further comprises increasing the amount of water injected into the cylinder proportional to a second rate of increase of the temperature of the exhaust catalyst until the temperature of the exhaust catalyst reaches a desired temperature.

7. The method of claim 6, wherein the desired temperature of the exhaust catalyst is a light-off temperature of the exhaust catalyst.

8. The method of claim 7, further comprising ceasing the injecting of the water into the cylinder while continuing to inject fuel into the cylinder of the engine in response to one or more of the temperature of the exhaust catalyst reaching the light-off temperature and the engine speed reaching the desired speed.

9. A method, comprising:
   during an engine cold-start condition, injecting fuel into a cylinder of an engine via a fuel injector while injecting an initial amount of water into an intake manifold of the engine via a water injecting system, continuing the injecting of the initial amount of water until an engine speed reaches a threshold speed and thereafter adjusting an amount of injected water based on a level of water stored within an exhaust catalyst.

10. The method of claim 9, wherein the adjusting includes increasing the amount of injected water to proportionally increase the level of water stored in the exhaust catalyst, the increasing continued until the level of water stored in the exhaust catalyst reaches a threshold level.

11. The method of claim 10, wherein the adjusting further includes increasing the amount of water injected into the intake manifold to increase a temperature of the exhaust catalyst to a light-off temperature.

12. The method of claim 11, wherein the adjusting further includes stopping water injection into the intake manifold when one or more of the level of water stored in the exhaust catalyst reaches the threshold level and the temperature of the exhaust catalyst reaches the light-off temperature.

13. The method of claim 12, further comprising continuing to inject the fuel into the engine cylinder when the water injection into the intake manifold has stopped.

14. A system for a vehicle, comprising:
   an engine including a cylinder;
   a water injection system including a water injector coupled to an intake manifold;
   an exhaust catalyst coupled to an exhaust passage;
   a temperature sensor configured to measure a temperature of the exhaust catalyst;
   a speed sensor configured to measure an engine speed; and
   a controller including computer readable instructions for:
      during an engine cold-start, activating the water injector to inject a mist of water into the intake manifold when the engine speed is below a threshold speed; and
      responsive to the engine speed rising above the threshold speed, increase an amount of water injected into the intake manifold based on a rate of increase of the temperature of the exhaust catalyst.

15. The system of claim 14, wherein the controller includes further instructions for:
   deactivating the water injector to stop injecting water into the intake manifold responsive to the temperature of the exhaust catalyst reaching an operational temperature.

16. The system of claim 14, wherein the controller includes further instructions for:

increasing the amount of water injected into the intake manifold proportional to an increase in a level of water stored in the exhaust catalyst.

17. The system of claim 16, wherein the controller includes further instructions for:
deactivating the water injector to stop injecting water into the intake manifold responsive to the level of water stored in the exhaust catalyst reaching a threshold level.

18. The system of claim 17, wherein the controller includes further instructions for:
estimating the threshold level based on a capacitance of the exhaust catalyst and a heat capacity of the exhaust catalyst.

19. The system of claim 14, further comprising a fuel injector configured to inject fuel into the cylinder and wherein the controller includes further instructions for:
activating the fuel injector while activating the water injector.

20. The system of claim 19, wherein the controller includes further instructions for:
maintaining the fuel injector active while deactivating the water injector.

* * * * *